Feb. 17, 1931.  G. F. WILDE ET AL  1,792,788
TILE GLAZING MACHINE
Filed April 2, 1928  5 Sheets-Sheet 4
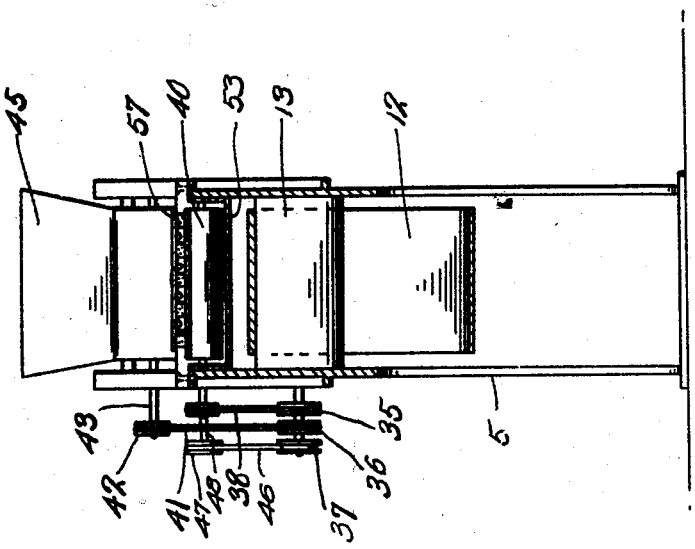
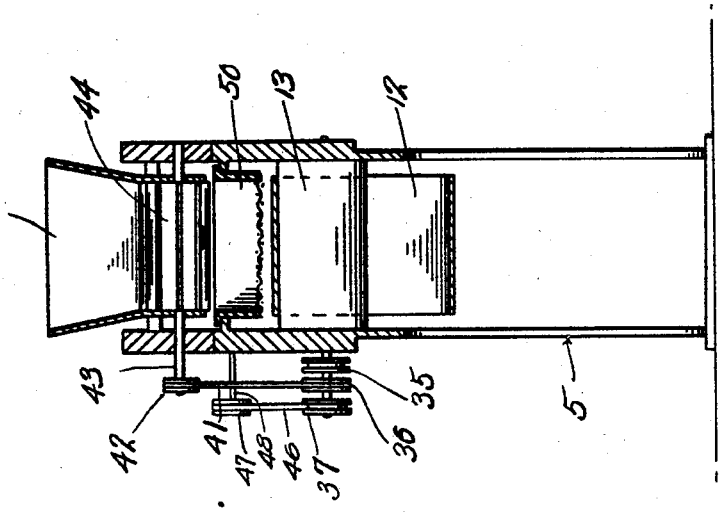
George F. Wilde  Inventors
B. K. Eskesen  &
By Clarence A. O'Brien
Attorney Feb. 17, 1931.  G. F. WILDE ET AL  1,792,788
TILE GLAZING MACHINE
Filed April 2, 1928   5 Sheets-Sheet 5
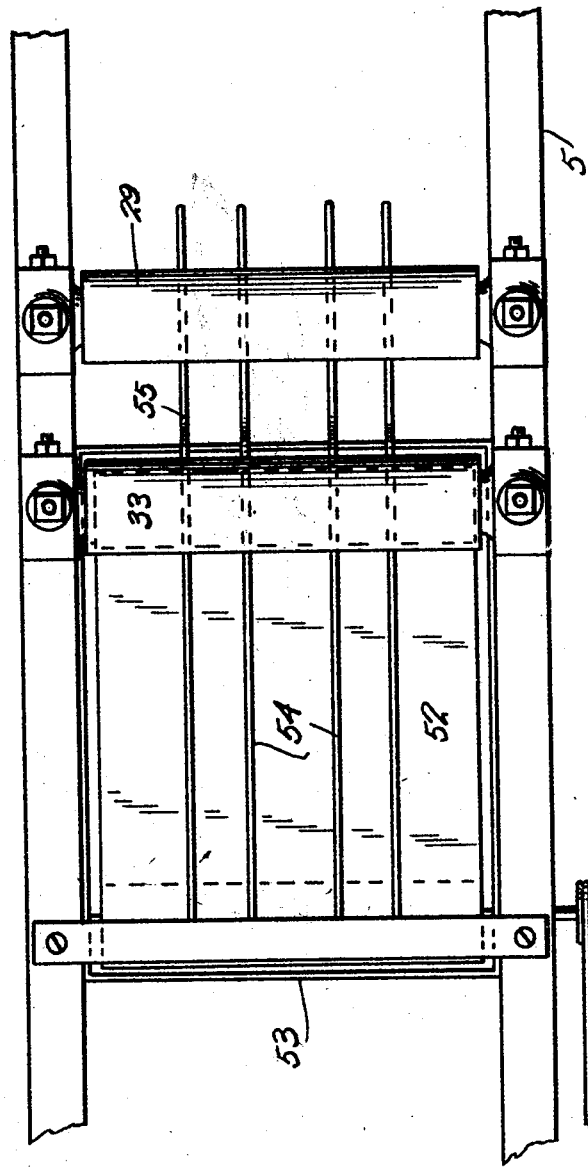
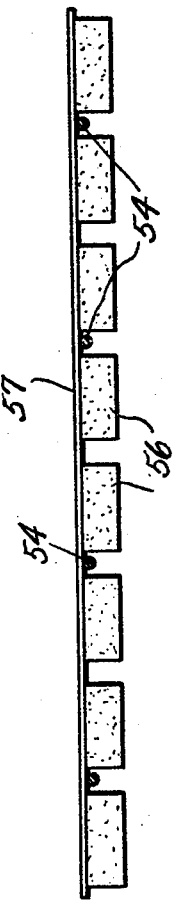
George F. Wilde  *Inventors*
B. K. Eskesen  &
By Clarence A. O'Brien
*Attorney*

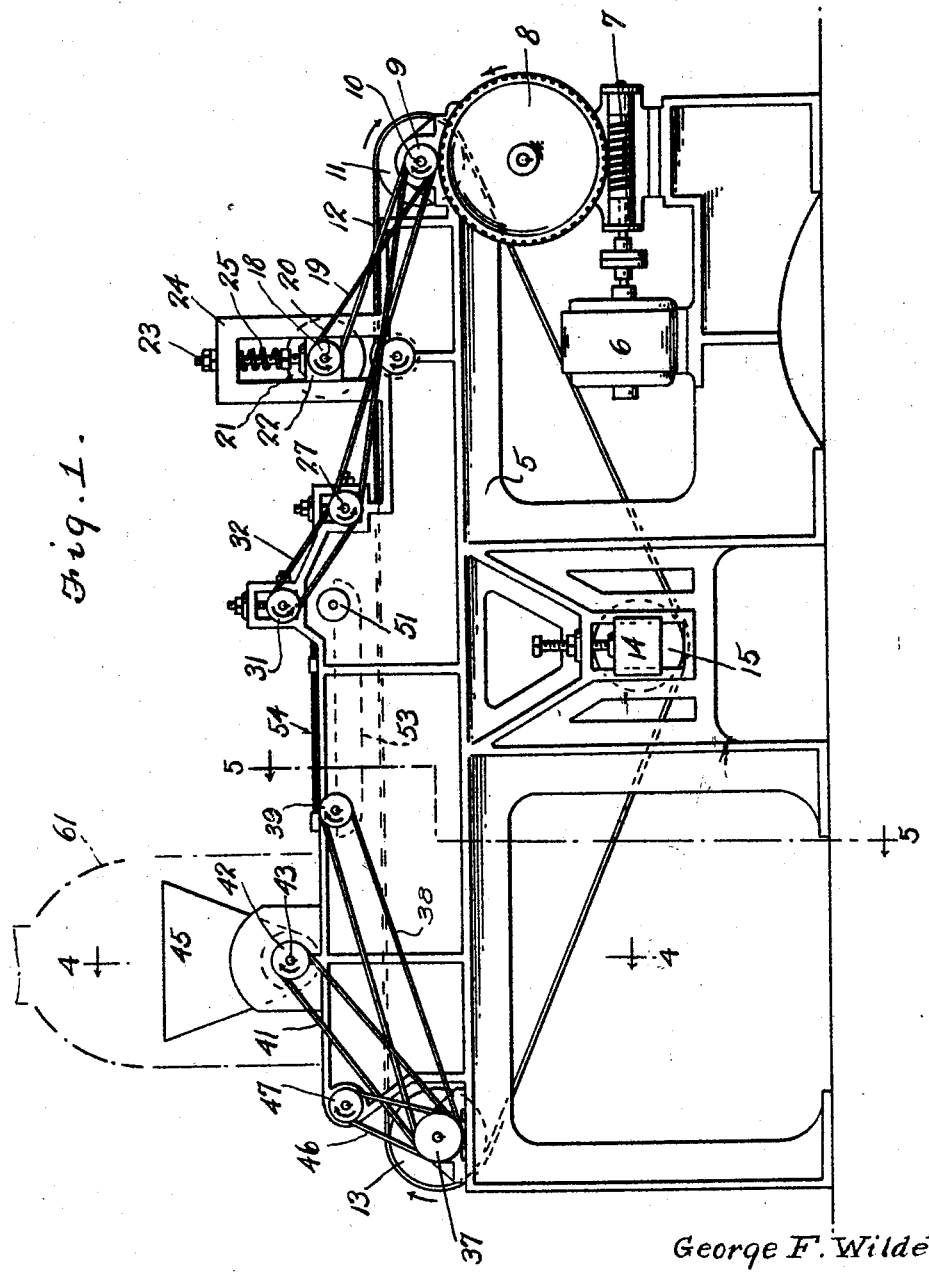

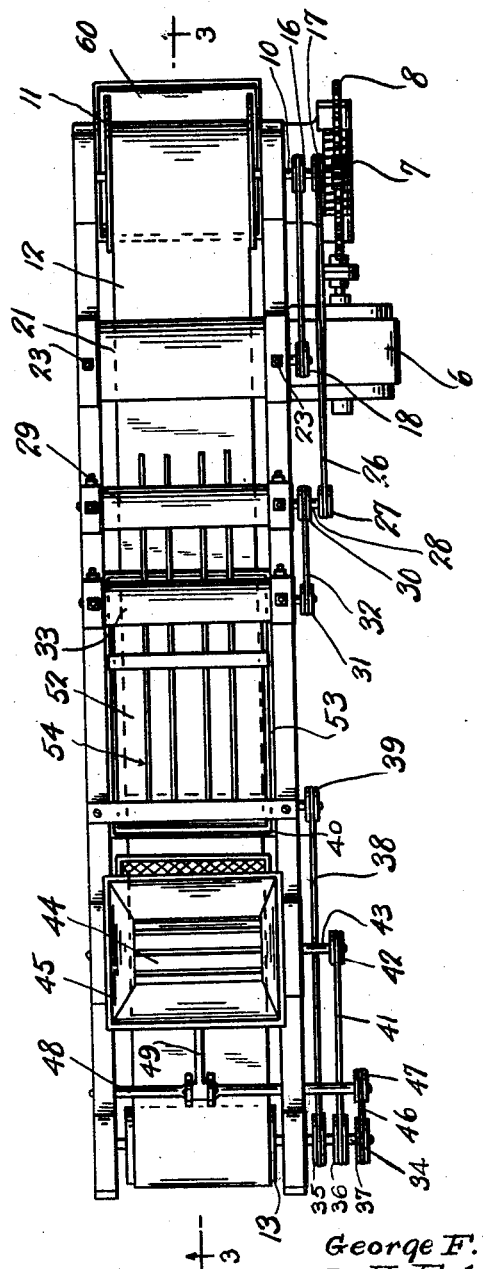

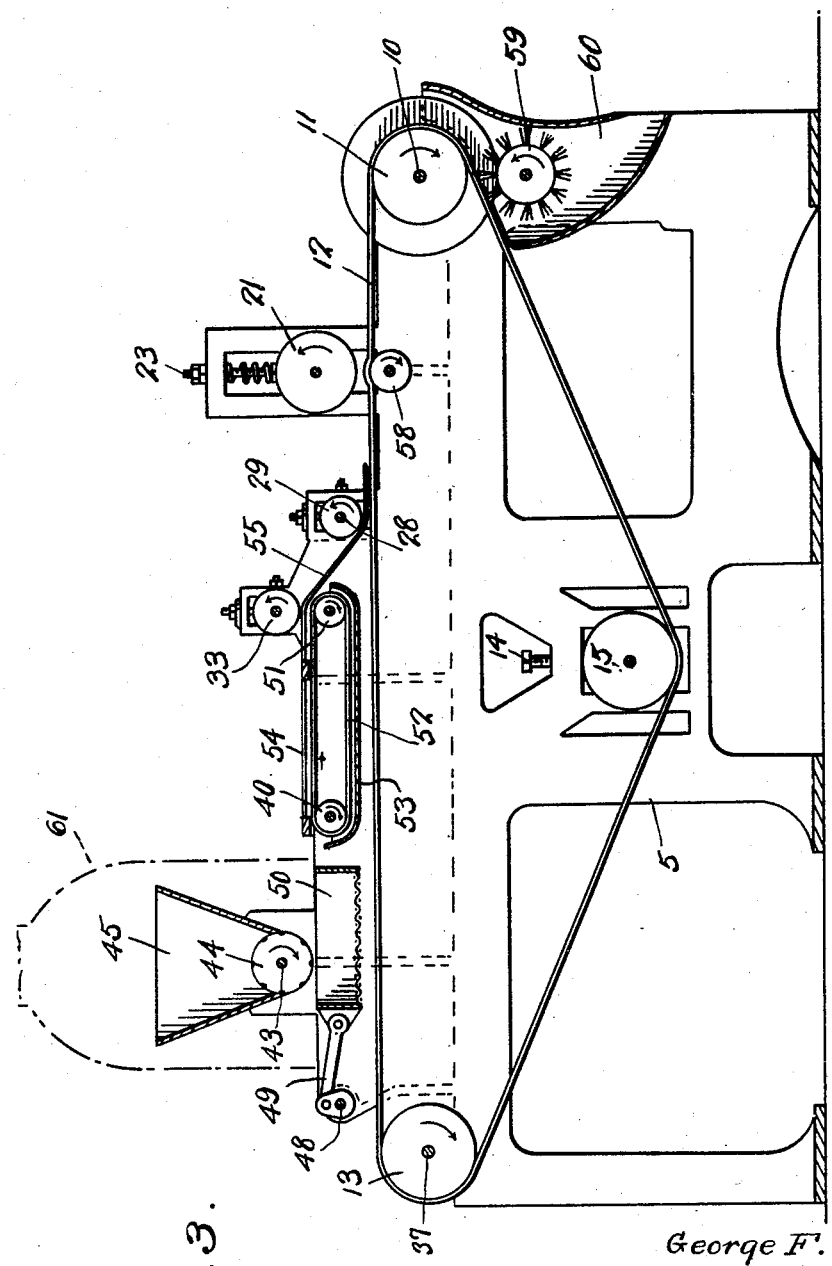

Patented Feb. 17, 1931

1,792,788

UNITED STATES PATENT OFFICE

GEORGE F. WILDE AND BENNET K. ESKESEN, OF MATAWAN, NEW JERSEY

TILE-GLAZING MACHINE

Application filed April 2, 1928. Serial No. 266,806.

The present invention relates to tile glazing machines and has for its principal object to provide an apparatus of this character adapted to apply a coating of powdered glaze to the tile after first having a coating of adhesive applied thereto, so that the glaze covered tile may then be baked or otherwise fire treated for causing the powdered glaze to permanently adhere thereto.

A further object of the invention is to provide a machine in which the powdered glaze may be deposited upon a conveyor belt and including a tile feed mechanism by means of which strips of the tile may first be coated with an adhesive, after which the tile may be moved into contact with the glaze covered conveyor belt, for receiving a coating of the powdered glaze and for feeding the glazed tile to a pair of pressure rollers, after which the tile are discharged from the belt and ready for firing.

A further object of the invention is to provide an apparatus of this character of a simple and practical construction, which is efficient and practical in performance, which is adapted to handle tile of various sizes, relatively inexpensive to manufacture and maintain in operation and otherwise well adapted for the purposes for which the same is intended.

Other objects and advantages reside in the specific construction and combination of the various elements comprising the invention, reference being had to the accompanying drawings, forming a part hereof, wherein:

Figure 1 is a side elevational view of the machine.

Figure 2 is a top plan view.

Figure 3 is a longitudinal vertical sectional view therethrough.

Figure 4 is a vertical transverse sectional view, taken substantially along the line 4—4 of Figure 1.

Figure 5 is a similar view, taken along the line 5—5 of Figure 1.

Figure 6 is a fragmentary plan view of a portion of the frame of the apparatus and showing the tile supporting rods, and Figure 7 is a front elevation view of a strip of tiling, showing the same mounted upon the supporting rods.

Referring now to the drawings in detail, the invention comprises a supporting frame 5, having a motor 6 mounted thereon, adapted to operate a worm 7 provided with a worm wheel 8 for driving a gear 9 mounted at one end of a shaft 10 extending transversely at one end of the frame.

Mounted on the shaft and for rotation therewith is a roller 11, about which is extended a conveyor belt 12, said belt being also mounted upon a similar roller 13 arranged at the opposite end of the machine. The upper portion of the belt is adapted to move longitudinally of the frame on a horizontal plane, the belt being maintained under suitable tension by means of an adjustable belt tightener 14, arranged at the lower portion of the frame and having a roller 15 engaging the lower portion of the belt. A pair of pulley wheels indicated at 16 and 17 respectively are mounted on the shaft 10, the pulley wheel 16 being connected with the pulley wheel 18, to a drive belt 19, the pulley wheel 18 being mounted on a shaft 20, extending transversely above the conveyor belt 12 and on which is also arranged a pressure roll 21. The pressure roll 21 is arranged for adjustment with respect to the upper surface of the conveyor belt 12 as is clearly illustrated in Figure 1 of the drawing, said adjustment comprising a vertically movable bearing block 22 for the shaft 20, said bearing block being suspended by the bolt 23 carried in the supporting bracket 24, the bolt also carrying a coil spring 25, for yieldably urging the bearings 22 downwardly in a direction toward the conveyor belt. The pulley wheel 17 is arranged for operating a belt 26, extending about a pulley wheel 27 mounted on a shaft 28 also extending transversely above the conveyor belt 12.

The shaft 28 also has a tile transfer roller 29 mounted thereon. A second pulley wheel 30 is carried by the shaft 28 for operating a similar pulley wheel 31 through a belt 32, the pulley wheel 31 being arranged for operating another pressure roller 33, extending transversely of the conveyor belt, said rollers 29 and 30 being adjustably supported in a similar manner as the roller 21. The roller 13 at the opposite end of the frame is supported on a shaft 34, which extends outwardly from the frame and upon which shaft is also mounted a plurality of pulley wheels shown at 35, 36, and 37, the pulley wheel 35 being arranged to operate a belt 38 connected with a pulley wheel 39 arranged at one end of a roller 40. The pulley wheel 36 is adapted to operate a belt 41 connected to a pulley wheel 42 mounted on a shaft 43 together with an agitator 44 arranged within a hopper 45. The pulley wheel 37 is arranged to operate a belt 46 connected with a pulley 47 mounted on a shaft 48 extending transversely of the frame, said shaft being provided with a crank 49 for reciprocably operating a screen 50 disposed beneath the discharge end of the hopper 45. The roller 40 is associated with a similar roller 51 adapted to operate an endless adhesive belt 52, the lower portion of which is submerged in an adhesive container 53, by means of which a belt 52 can pick up a quantity of adhesive placed in the container during the operation of the belt. Disposed immediately above the adhesive belt 52 is a plurality of spaced apart longitudinally extending tile supporting rods 54.

As will be seen from an inspection of Figure 3 of the drawings, the rods 54 extend beneath the rollers 33 and 29 and terminate in a position slightly above the conveyor belt 12 in advance of the pressure roller 21. It will also be observed from Figure 3 of the drawing, that the adhesive container 53 and the adhesive belt 52 operable therein are also arranged above the conveyor belt 12, so that it is necessary to bend the rods 54 downwardly as shown at 55, in order that the heads thereof may be disclosed in close proximity to the belt 12. The apparatus described above is adapted to be used for all sizes of tiles, and in the explanation of the mode of operation of the machine, we will describe the process of glazing small mosaic tile which are the most difficult to glaze.

These tile in the form of relatively small blocks as shown at 56, in Figure 7 of the drawing are pasted on paper sheets in a uniform manner, with the tile slightly spaced apart, and these sheets are then placed, with the tile faced downwardly on the tile rods 54, with the rods disposed between the tile.

Upon the operation of the motor 6, the conveyor belt will be moved in a direction from left to right as shown by the arrows, the upper surface of the belt being covered with a quantity of powdered glaze from the hopper 45 and which will be spread in a substantially uniform manner by means of the reciprocably operated screen 50.

As the tile are placed on the tile rods 54, it will be seen that the lowermost face thereof will rest upon the upper portion of the adhesive belt 52 whereby to receive a coating of adhesive on the under side of the tile. The adhesive belt 52 will operate to move the tile as indicated by the arrow in Figure 3, under the pressure roll 33, which cooperates with the roller 51, so that the tile will be forced against the adhesive belt to cause a suitable quantity of the adhesive to adhere thereto. The strip of tile will then pass down the inclined portion of the rods 55 under the tile transfer roller 29, where the same are moved from the end of the rods onto the conveyor belt 12. The adhesive coating on the under side of the tile will accordingly pick up a suitable quantity of the powdered glaze from the conveyor belt and as the tile move toward the pressure roller 21, the powdered glass will be pressed into the adhesive substance so that a suitable quantity of the glaze will adhere thereto. An idler roller 58 is rotatably supported beneath the belt 12 in vertical alignment with the pressure roller 21 and arranged to cooperate therewith during the movement of the tile beneath the pressure roll so as to form a foundation for pressing the tile. After passing under the pressure roll 21, the tile are then discharged from the conveyor belt ready for firing.

Disposed beneath the roller 11 is a brush 59, adapted to brush the surplus powdered glaze from the surface of the conveyor belt 12 and convey the same through a chute 60 into a suitable receptacle for returning the same to the hopper 45. A dust collector indicated by the dotted line at 61 may be placed over the hopper to avoid the escape of dust created by the agitator therein. It is believed that the details of construction and operation will be thoroughly understood from the foregoing description without necessitating a more detailed explanation thereof.

It is obvious that the invention is susceptible of various changes and modifications, without departing from the spirit or scope of the invention or sacrificing any of its advantages, and we accordingly claim all such forms of the device to which we are entitled.

Having thus described our invention, what we claim as new is:

1. In an apparatus of the class described, a conveyor belt, a hopper adapted to discharge a quantity of powdered glaze upon the upper surface of the belt, an adhesive coating bolt, a plurality of tile supporting rods adapted to support a strip of tile in contacting engagement with said adhesive belt, a transfer roller adapted to transfer the tile from said rods onto said glaze covered conveyor belt and a common drive means for said conveyor belt, said adhesive belt and said transfer roller.

2. An apparatus of the class described comprising a conveyor belt, a hopper adapted to contain a quantity of powdered glaze, a reciprocably actuated screen disposed beneath the hopper and adapted to distribute the powdered glaze upon the upper surface of the belt in a uniform manner, an adhesive container arranged above said conveyor belt, an adhesive feed belt associated with said adhesive container, a plurality of tile supporting rods arranged adjacent said adhesive belt and adapted to support a strip of tile face downward for engagement with the surface of said adhesive belt, a tile transfer roller arranged for engagement with the tile whereby to discharge the tile from said rods onto the upper surface of the glaze covered conveyor belt, a pair of pressure rollers adapted to engage the tile for pressing the same against said adhesive belt and said glaze covered conveyor belt and common drive means for said conveyor belt, said reciprocating screen, adhesive belt, transfer and pressure rollers.

3. In combination, a supporting frame having a pair of rollers rotatably mounted at opposite ends thereof, an endless conveyor belt carried by said rollers, a powdered glaze hopper arranged above the belt, a reciprocally actuated screen interposed between the discharge mouth of the hopper and the belt adapted to evenly distribute the glaze upon the upper surface of the belt, an adhesive container arranged above the belt, an endless belt partly submerged in the adhesive in said container, a plurality of longitudinally extending spaced parallel tile supporting rods arranged above said adhesive belt and adapted to support a strip of tile face downward from a backing sheet extended transversely above the rods whereby to apply an adhesive coating to the under face of the tile, a transfer roller for moving the tile from the rods to the conveyor belt with the adhesive side face downward and a pressure roller arranged to force the tile into the layer of glaze on said belt.

4. In combination, a supporting frame having a pair of rollers rotatably mounted at opposite ends thereof, an endless conveyor belt carried by said rollers, a powdered glaze hopper arranged above the belt, a reciprocably actuated screen interposed between the discharge mouth of the hopper and the belt adapted to evenly distribute the glaze upon the upper surface of the belt, an adhesive container arranged above the belt, an endless belt partly submerged in the adhesive in said container, a plurality of longitudinally extending spaced parallel tile supporting rods arranged above said adhesive belt and adapted to support a strip of tile face downward from a backing sheet extended transversely above the rods whereby to apply an adhesive coating to the under face of the tile, a transfer roller for moving the tile from the rods to the conveyor belt with the adhesive side face downward and a pressure roller arranged to force the tile into the layer of glaze on said belt, and interconnected drive means for said conveyor belt rollers, said screen, said adhesive belt, said transfer roller and said pressure roller.

5. In combination, a supporting frame having a pair of rollers rotatably mounted at opposite ends thereof, an endless conveyor belt carried by said rollers, a powdered glaze hopper arranged above the belt, a reciprocably actuated screen interposed between the discharge mouth of the hopper and the belt adapted to evenly distribute the glaze upon the upper surface of the belt, an adhesive container arranged above the belt, an endless belt partly submerged in the adhesive in said container, a plurality of longitudinally extending spaced parallel tile supporting rods arranged above said adhesive belt and adapted to support a strip of tile face downward from a backing sheet extended transversely above the rods whereby to apply an adhesive coating to the under face of the tile, a transfer roller for moving the tile from the rods to the conveyor belt with the adhesive side face downward and a pressure roller arranged to force the tile into the layer of glaze on said belt, a cleaning brush for removing the surplus glaze from the conveyor belt after the contact of the tile therewith, and interconnected drive means for said conveyor belt rollers, said screen, said adhesive belt, said transfer roller, said pressure roller, and said cleaning brush.

6. In an apparatus of the class described, a conveyor, means for feeding granulated material thereupon, an adhesive applicator, means for supporting work in block form face downwardly for receiving a coating of adhesive on the under side from the applicator, and means for feeding the block upon the conveyor with the coated side downwardly.

7. In an apparatus of the class described, a conveyor, means for feeding granulated material thereupon, an adhesive applicator, strip material supporting means, said material having blocks secured thereto in spaced relation with the supporting means interposed between the blocks for uniformly supporting the blocks in position for receiving a coating of adhesive on one side thereof from the applicator, and means for feeding the blocks upon the conveyor with the coated side downwardly.

8. In an apparatus of the class described, a conveyor, means for feeding granulated material thereupon, a plurality of spaced rods adapted to support strips of material thereupon, said material having blocks of a predetermined area suspended therefrom and disposed in spaced relation from each other with the rods arranged therebetween, an adhesive applicator movable beneath the rods for coating the under side of the blocks and transferring the blocks onto the conveyor with the coated side downwardly.

9. In an apparatus of the class described, a conveyor, means for feeding granulated material thereupon, an adhesive trough, an applicator comprising an endless belt mounted in the trough and operated in a manner coinciding with the conveyor, a plurality of rods disposed longitudinally above the belt and adapted for slidably supporting strips of material having blocks of a predetermined area suspended therefrom, said blocks being disposed in position for contact with the belt whereby to receive a coating of adhesive upon their lower faces from the belt and to travel under the rods for discharge from one end of the belt and means for transferring the blocks to the conveyor with their coated faces downwardly.

10. In an apparatus of the class described, a conveyor, means for feeding granulated material thereupon, an adhesive trough, an applicator comprising an endless belt mounted in the trough and operated in a manner coinciding with the conveyor, a plurality of rods disposed longitudinally above the belt and adapted for slidably supporting strips of material having blocks of a predetermined area suspended therefrom said blocks being disposed in position for contact with the belt whereby to receive a coating of adhesive upon their lower faces from the belt, and to travel under the rods for discharge from one end of the belt, said rods projecting beyond the discharge end of the belt and inclined downwardly with their lower ends disposed in substantially closely spaced relation above the conveyor for transferring the blocks from the rods to the conveyor with their coated faces downwardly.

11. In an apparatus of the class described, a conveyor, means for feeding granulated material thereupon, an adhesive trough, an applicator comprising an endless belt mounted in the trough and operated in a manner coinciding with the conveyor, a plurality of rods disposed longitudinally above the belt and adapted for slidably supporting strips of material having blocks of a predetermined area suspended therefrom said blocks being disposed in position for contact with the belt whereby to receive a coating of adhesive upon their lower faces from the belt, and to travel under the rods for discharge from one end of the belt, said rods projecting beyond the discharge end of the belt and inclined downwardly with their lower ends disposed in substantially closely spaced relation above the conveyor for transferring the blocks from the rods to the conveyor with their coated faces downwardly, and a pressure roller for engaging the blocks for pressing the same upon the surface of the conveyor.

In testimony whereof we affix our signatures.

GEORGE F. WILDE.
BENNET K. ESKESEN.